United States Patent
Ma et al.

(10) Patent No.: US 12,314,748 B2
(45) Date of Patent: May 27, 2025

(54) DYNAMIC CLOUD DEPLOYMENT OF ROBOTIC PROCESS AUTOMATION (RPA) ROBOTS

(71) Applicant: UiPath Inc., New York, NY (US)

(72) Inventors: Tao Ma, Bellevue, WA (US); Tarek Madkour, Sammamish, WA (US); Remus Rusanu, Bucharest (RO); Clement B Fauchere, Sammamish, WA (US)

(73) Assignee: UiPath Inc., New York, NY (US)

( * ) Notice: Subject to any disclaimer, the term of this patent is extended or adjusted under 35 U.S.C. 154(b) by 953 days.

(21) Appl. No.: 17/247,669

(22) Filed: Dec. 18, 2020

(65) Prior Publication Data

US 2022/0197249 A1 Jun. 23, 2022

(51) Int. Cl.
*G06F 9/455* (2018.01)

(52) U.S. Cl.
CPC ............ *G06F 9/45558* (2013.01); *G05B 2219/50391* (2013.01)

(58) Field of Classification Search
None
See application file for complete search history.

(56) References Cited

U.S. PATENT DOCUMENTS

| | | |
|---|---|---|
| 7,861,252 B2 | 12/2010 | Uszok et al. |
| 8,793,684 B2 | 7/2014 | Breitgand et al. |
| 9,876,676 B1 | 1/2018 | Sandham |
| 10,042,657 B1 | 8/2018 | Lauinger |
| 10,248,445 B2 | 4/2019 | Khandekar et al. |
| 10,264,058 B1 | 4/2019 | Lauinger |
| 10,564,946 B1 * | 2/2020 | Wagner .............. G06F 8/433 |
| 10,860,905 B1 | 12/2020 | Gligan |
| 10,931,741 B1 * | 2/2021 | Liguori ............... G06F 8/63 |
| 11,032,164 B1 * | 6/2021 | Rothschild ......... H04L 41/40 |
| 11,354,164 B1 * | 6/2022 | Dennis ............. G06F 9/5077 |
| 2005/0246353 A1 * | 11/2005 | Ezer ................ G06F 40/186 |

(Continued)

FOREIGN PATENT DOCUMENTS

| | | |
|---|---|---|
| CN | 109636504 A | 4/2019 |
| JP | 2018176387 A | 11/2018 |
| JP | 2019074889 A | 5/2019 |

OTHER PUBLICATIONS

Automation Edge, "Introducing Automation Edge RPA on Cloud," downloaded from https://web.archive.org/web/20190703134925/https://automationedge.com/product/rpa-on-cloud/, Jul. 3, 2019.

(Continued)

*Primary Examiner* — Wynuel S Aquino
(74) *Attorney, Agent, or Firm* — Law Office of Andrei D Popovici, PC

(57) ABSTRACT

In some embodiments, an automation optimizer is configured to determine whether a provisioning condition is satisfied, for instance according to a current length of a job queue, or according to a current workload of a selected RPA host platform executing a plurality of software robots. When to the provisioning condition is satisfied, some embodiments automatically provision additional VMs onto the respective RPA host platform, and automatically remove VMs when automation demand is low. Exemplary RPA hosts include cloud computing platforms and on-premises servers, among others.

17 Claims, 8 Drawing Sheets

(56) References Cited

U.S. PATENT DOCUMENTS

| | | | |
|---|---|---|---|
| 2010/0153482 | A1 | 6/2010 | Kim |
| 2010/0299366 | A1 | 11/2010 | Stienhans et al. |
| 2012/0260118 | A1* | 10/2012 | Jiang ............... G06F 9/4893 713/340 |
| 2012/0266168 | A1* | 10/2012 | Spivak ............... H04L 67/10 718/1 |
| 2015/0081885 | A1 | 3/2015 | Thomas et al. |
| 2016/0294643 | A1 | 10/2016 | Kim |
| 2017/0199770 | A1 | 7/2017 | Peteva et al. |
| 2018/0089698 | A1 | 3/2018 | Campana et al. |
| 2018/0096284 | A1* | 4/2018 | Stets ............... G06Q 10/063112 |
| 2018/0189093 | A1 | 7/2018 | Agarwal et al. |
| 2018/0203994 | A1 | 7/2018 | Shukla et al. |
| 2018/0341527 | A1 | 11/2018 | Ikkaku et al. |
| 2019/0155225 | A1 | 5/2019 | Kothandaraman et al. |
| 2019/0286474 | A1* | 9/2019 | Sturtivant ............... G06F 9/547 |
| 2019/0303779 | A1 | 10/2019 | Van Briggle et al. |
| 2020/0151650 | A1* | 5/2020 | Rhodes ............ G06Q 10/063114 |
| 2020/0341852 | A1* | 10/2020 | Chopra ............... G06F 11/1451 |
| 2020/0348964 | A1* | 11/2020 | Anand ............... G06F 9/45558 |
| 2020/0364083 | A1* | 11/2020 | Walby ............... G06F 9/5072 |
| 2021/0073034 | A1* | 3/2021 | Bliesner ............... G06F 9/5077 |
| 2022/0300336 | A1* | 9/2022 | Major ............... G06F 9/5038 |

OTHER PUBLICATIONS

Automation Edge, "Automation Edge Industry's First RPA on Cloud Solution," screenshots from video posted on https://www.youtube.com/watch?v=u_d2SXf2Mjl&feature=emb_logo, Jul. 18, 2019.

Zullo et al., "Robotics (RPA) as a Service," downloaded from https://www.eisneramper.com/newsletters/prts-intelligence/robotics-rpa-cloud-computing-PRTS-0619/, Jun. 11, 2019.

Lateetud, "RPA as a Service," downloaded from https://www.lateetud.com/insight-details/rpa-as-a-service-, Jul. 25, 2019.

Thoughtonomy, "A Virtual Workforce in One Intelligent Automation Product," downloaded from https://thoughtonomy.com/intelligent-automation[Dec. 10, 2019 3:53:17 PM], Dec. 10, 2019.

digitalexchange.blueprism.com,"Blue Prism Azure Trial", https://digitalexchange.blueprism.com/dx/entry/3439/solution/blue-prism-on-azure-marketplace, downloaded on Apr. 16, 2020.

quali.com, "CloudShell Pro Overview," https://info.quali.com/hubfs/CloudShell%20Pro%20Datasheet.pdf, downloaded on Apr. 16, 2020.

quali.com, "Quali Joins Google Cloud Partnership Ecosystem," downloaded from https://www.prweb.com/releases/quali_joins_google_cloud_partnership_ecosystem/prweb16749139.htm, Austin, TX, USA, Dec. 10, 2019.

virsoft.net, "Virsoft Solution Demo as a Service", screenshots from video posted on https://www.youtube.com/watch?v=ISfwkgKQ974, Aug. 30, 2012.

virsoft.net, "Demo as a Service," https://virsoft.sharepoint.com/Documents/Virsoft%20Datasheet%20for%20web.pdf, downloaded on Apr. 16, 2020.

Korean Intellectual Property Office, International Search Report and Written Opinion for International Application No. PCT/US2020/049300 mailed Dec. 22, 2020, international filing date Sep. 4, 2020, priority date Dec. 23, 2019.

USPTO, Office Action mailed Jun. 14, 2021 for U.S. Appl. No. 16/725,706, filed Dec. 23, 2019.

USPTO, Office Action mailed Apr. 12, 2021 for U.S. Appl. No. 16/725,706, filed Dec. 23, 2019.

European Patent Office (EPO), Supplementary European Search Report Mailed Feb. 4, 2022 for EPO Application No. EP 20808274.3.

Anonymous, "Robotic Process Automation (RPA): Cloud vs. On-Premises," https://digitalworkforce.com/rpa-news/robotic-process-automation-cloud-vs-premises, Aug. 14, 2019.

Anonymous, "Scaling RPA—Best Technological Practices to Scale RPA," https://digitalworkforce.com/rpa-news/scaling-rpa-best-technological-practices-to-scale-enterprise-robotic-process-automation, Aug. 20, 2019.

USPTO, Office Action mailed Feb. 14, 2023 for U.S. Appl. No. 17/655,177, filed Mar. 17, 2022.

European Patent Office (EPO), European Search Report Mailed May 6, 2022 for EPO Application No. EP 21215084.1-1203.

USPTO, Office Action mailed Aug. 20, 2021 for U.S. Appl. No. 16/725,706, filed Dec. 23, 2019.

USPTO, Office Action mailed May 17, 2024 for U.S. Appl. No. 17/643,741, filed Dec. 10, 2021.

Japan Patent Office (JPO), Office Action mailed Sep. 18, 2024 for Japan Patent Application No. 2020-564879, filed Sep. 25, 2020.

USPTO, Notice of Allowance mailed Aug. 28, 2024 for U.S. Appl. No. 17/643,741, filed Dec. 10, 2021.

\* cited by examiner

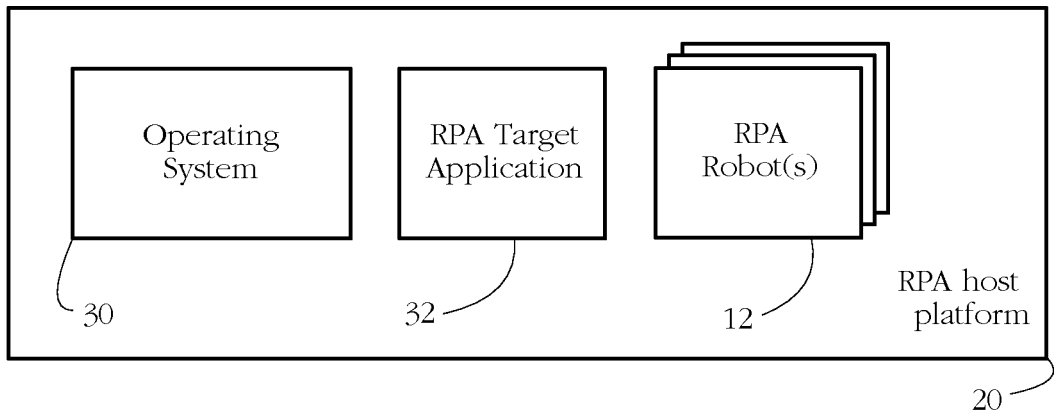
FIG. 4-A
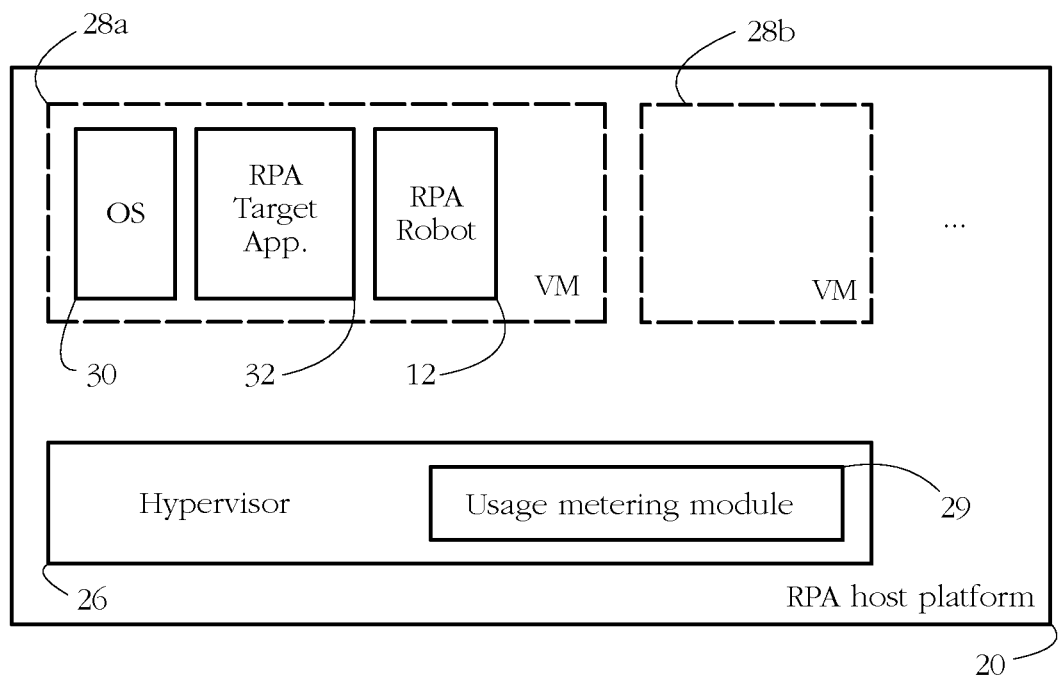
FIG. 4-B

FIG. 7-A

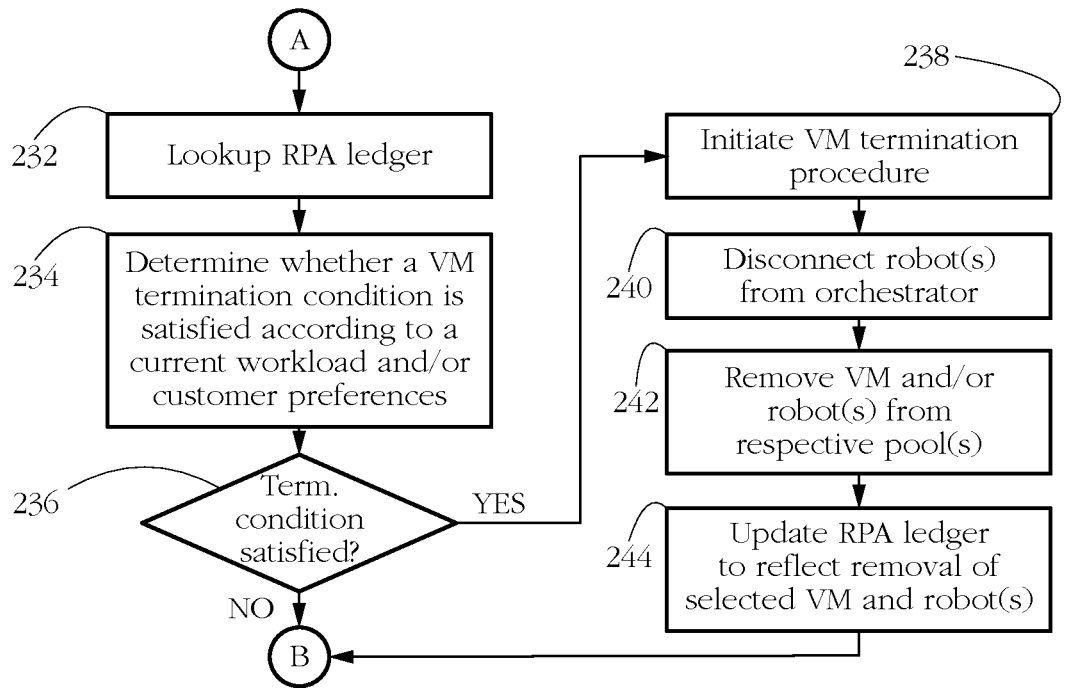
FIG. 7-B
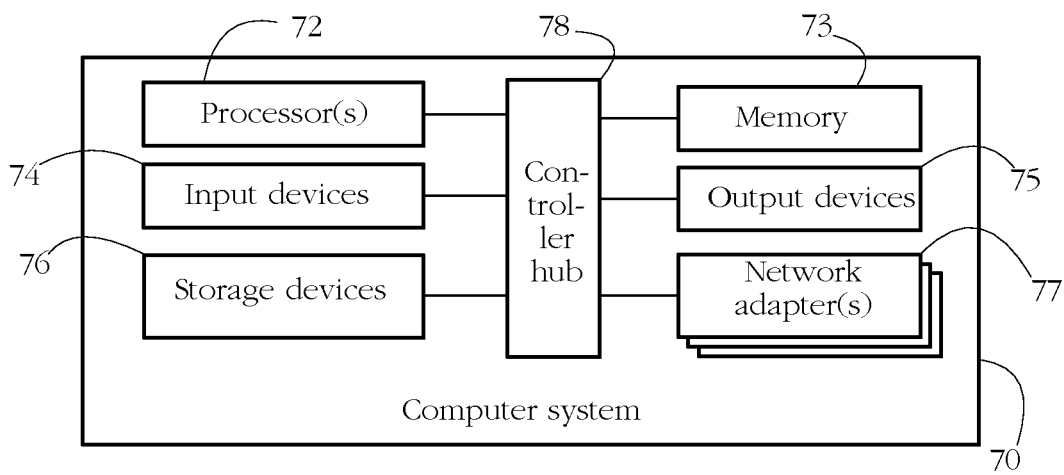
FIG. 8

DYNAMIC CLOUD DEPLOYMENT OF ROBOTIC PROCESS AUTOMATION (RPA) ROBOTS

BACKGROUND

The invention relates to robotic process automation (RPA), and in particular to performing RPA activities on cloud computing platforms.

RPA is an emerging field of information technology aimed at improving productivity by automating repetitive computing tasks, thus freeing human operators to perform more intellectually sophisticated and/or creative activities. Notable tasks targeted for automation include, among others, extracting structured data from documents, generating invoices and other business documents, and interacting with user interfaces for instance to fill in forms.

One particular area of interest spurred on by the rapid development of cloud computing comprises performing RPA activities in the cloud, i.e., on remotely accessible computing platforms implementing infrastructure as a service (IaaS) and/or software as a service (SaaS) business models. However, such developments face specific technical hurdles. For instance, successfully performing RPA in the cloud typically requires simultaneous knowledge of RPA tools, cloud management, and virtualization, among others, which is expected to exceed the competence of the average RPA developer. There is therefore a strong interest in facilitating the programming and deployment of software robots designed to execute in the cloud, with the ultimate goal of extending the reach of RPA technology to users that lack advanced programming skills or training.

SUMMARY

According to one aspect, a robotic process automation (RPA) method comprises employing at least one hardware processor of a computer system to determine whether a provisioning condition is satisfied according to a queue of RPA jobs and further according to a pool of RPA robots currently instantiated on a selected RPA host platform. The method further comprises in response, when the provisioning condition is satisfied, initiating an automatic provisioning of a virtual machine (VM) on the selected RPA host platform according to a VM template selected from a template repository according to an RPA job of the queue, wherein executing the VM template causes the VM to instantiate an RPA robot for executing the RPA job. The method to further comprises in response to the provisioning of the VM, connecting the RPA robot to an RPA orchestrator configured to assign the queue of RPA jobs to the pool of RPA robots. The method further comprises determining whether a machine termination condition is satisfied; and in response, when yes, initiating an automatic termination of the VM.

BRIEF DESCRIPTION OF THE DRAWINGS

The foregoing aspects and advantages of the present invention will become better understood upon reading the following detailed description and upon reference to the drawings where:

FIG. 4-A shows exemplary RPA components executing on an RPA host according to some embodiments of the present invention.

FIG. 4-B shows exemplary RPA components executing on an RPA host in an embodiment that uses hardware virtualization.

FIG. 7-B shows another exemplary sequence of steps performed by the automation to optimizer according to some embodiments of the present invention.

FIG. 8 shows an exemplary hardware configuration of a computing appliance programmed to execute some of the methods described herein.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized, searchable collection of data. Computer-readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
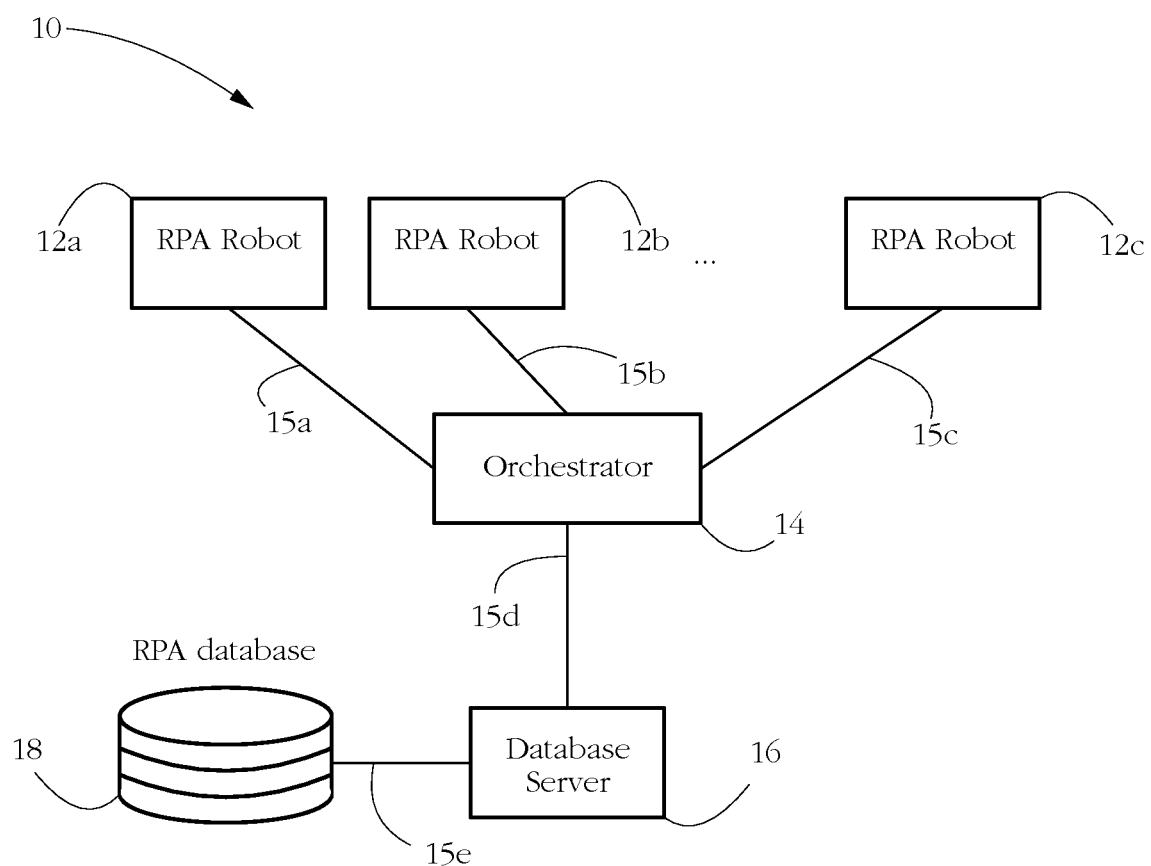
FIG. 1 shows an exemplary robotic process automation (RPA) environment according to some embodiments of the present invention.

FIG. 1 shows an exemplary robotic process automation (RPA) environment 10 according to some embodiments of the present invention. Environment 10 comprises various software components which collaborate to achieve the automation of a particular task. In an exemplary RPA scenario, an employee of a company uses a business application (e.g., word processor, spreadsheet editor, browser, email application) to perform a repetitive task, for instance to issue invoices to various clients. To actually carry out the respective task, the employee performs a sequence of operations/actions, which is herein deemed a process. Exemplary operations forming a part of an invoice-issuing process may include opening a Microsoft Excel® spreadsheet, looking up company details of a client, copying the respective details into an invoice template, filling out invoice fields indicating the purchased items, switching over to an email application, composing an email message to the respective client, attaching the newly created invoice to the respective email message, and clicking a 'Send' button. Various elements of RPA environment 10 may automate the respective process by mimicking the set of operations performed by the respective human operator in the course of carrying out the respective task.

Mimicking a human operation/action is herein understood to encompass reproducing the sequence of computing events that occur when a human operator performs the respective operation/action on the computer, as well as reproducing a result of the human operator's performing the respective operation on the computer. For instance, mimicking an action of clicking a button of a graphical user interface may comprise having the operating system move the mouse pointer to the respective button and generating a mouse click event, or may alternatively comprise toggling the respective GUI button itself to a clicked state.

Processes typically targeted for such automation include processing of payments, invoicing, communicating with business clients (e.g., distribution of newsletters and/or product offerings), internal communication (e.g., memos, scheduling of meetings and/or tasks), auditing, and payroll processing, among others. In some embodiments, a dedicated RPA design application 30 (FIG. 2) enables a human developer to design a software robot to implement a workflow that effectively automates a target process. A workflow typically comprises a sequence of custom automation steps, herein deemed activities. Each activity may include an action performed by the robot, such as clicking a button, reading a file, writing to a spreadsheet cell, etc. Activities may be nested and/or embedded. In some embodiments, RPA design application 30 exposes a user interface and set of tools that give the developer control of the execution order and the relationship between activities of a workflow. One commercial example of an embodiment of RPA design application 30 is UiPath StudioX™.

Some types of workflows may include, but are not limited to, sequences, flowcharts, finite state machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Figure 2:
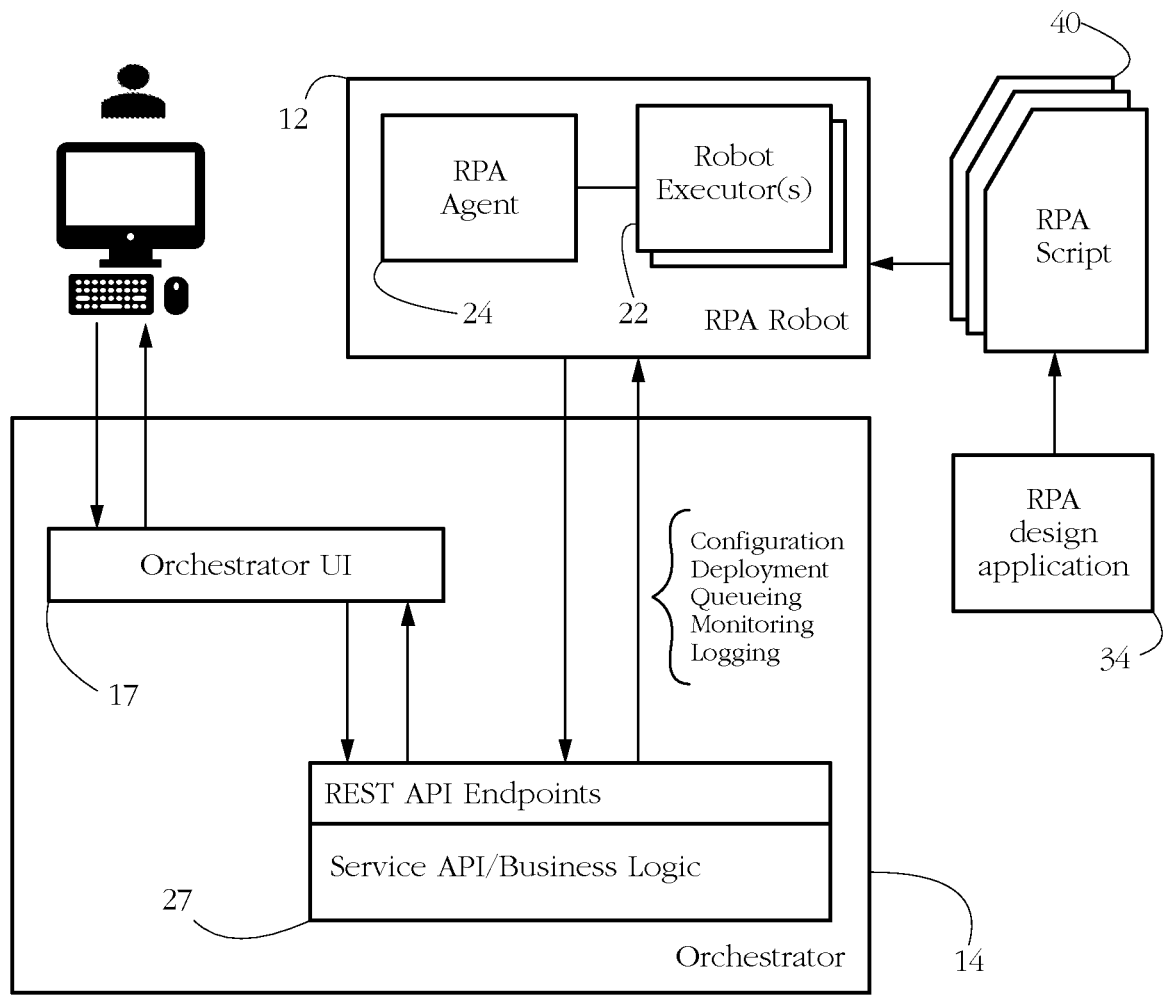
FIG. 2 illustrates exemplary components and operation of an RPA robot and orchestrator according to some embodiments of the present invention.

Once a workflow is developed, it may be encoded in computer-readable form as a set of RPA scripts 40 (FIG. 2). RPA scripts 40 may be formulated according to any data specification known in the art, for instance in a version of an extensible markup language (XML), Javascript Object Notation (JSON), or a programming language such as C #, Visual Basic, Java, etc. Alternatively, RPA scripts 40 may be formulated in an RPA-specific version of bytecode, or even as a sequence of instructions formulated in a natural language such as English, Spanish, Japanese, etc. In some embodiments, scripts 40 are pre-compiled into a set of native processor instructions (e.g., machine code).

A skilled artisan will appreciate that RPA design application 30 may comprise multiple components/modules, which may execute on distinct physical machines. In one such example illustrating a cloud computing embodiment of the present invention, RPA design application 30 may execute in a client-server configuration, wherein one component of application 30 may expose a robot design interface to a user of a client computer, and another component of application 30 executing on a server computer may assemble the robot workflow and formulate/output RPA script 40. For instance, a developer may access the robot design interface via a web browser executing on the client computer, while the software processing the user input received at the client computer actually executes on the server computer.

Once formulated, scripts 40 may be executed by a set of robots 12a-c (FIG. 1), which may be further controlled and coordinated by an orchestrator 14. Robots 12a-c and orchestrator 14 may each comprise a plurality of computer programs, which may or may not execute on the same physical machine. Exemplary commercial embodiments of robots 12a-c and orchestrator 14 include UiPath Robots™ and UiPath Orchestrator™, respectively. Types of robots 12a-c include, but are not limited to, attended robots, unattended robots, development robots (similar to unattended robots, but used for development and testing purposes), and non-production robots (similar to attended robots, but used for development and testing purposes).

Attended robots are triggered by user events and/or commands and operate alongside a human operator on the same computing system. In some embodiments, attended robots can only be started from a robot tray or from a command prompt and thus cannot be controlled from orchestrator 14 and cannot run under a locked screen, for example. Unattended robots may run unattended in remote virtual environments and may be responsible for remote execution, monitoring, scheduling, and providing support for work queues.

Orchestrator 14 may have various capabilities including, but not limited to, provisioning, deployment, configuration, queueing, monitoring, logging, and/or providing interconnectivity for robots 12a-c. Provisioning may include creating and maintaining connections between robots 12a-c and orchestrator 14. Deployment may include ensuring the correct delivery of software (e.g, RPA scripts 40) to robots 12a-c for execution. Configuration may include maintenance and delivery of robot environments and workflow configurations. Queueing may include providing management of job queues and queue items. Monitoring may include keeping track of robot state and maintaining user permissions. Logging may include storing and indexing logs to a database and/or another storage mechanism (e.g., SQL, ElasticSearch™, Redis™). Orchestrator 14 may further act as a centralized point of communication for third-party solutions and/or applications.

FIG. 2 shows exemplary components of a robot 12 and orchestrator 14 according to some embodiments of the present invention. An exemplary RPA robot is constructed using a Windows™ Workflow Foundation Application Programming Interface from Microsoft, Inc. Robot 12 may comprise a set of executors 22 and an RPA agent 24. Robot executors 22 are configured to receive RPA script 40 indicating a sequence of activities that mimic the actions of a human operator carrying out a business process, and to actually perform the respective sequence of activities on the respective client machine. In some embodiments, robot executor(s) 22 comprise an interpreter (e.g., a just-in-time interpreter or compiler) configured to translate RPA script 40 into a runtime package comprising processor instructions for carrying out the operations described in the respective script. Executing script 40 may thus comprise executor(s) 22 translating RPA script 40 and instructing a processor of the respective host machine to load the resulting runtime package into memory and to launch the runtime package into execution. RPA agent 24 may manage the operation of robot executor(s) 22. For instance, RPA agent 24 may select tasks/scripts for execution by robot executor(s) 22 according to an input from a human operator and/or according to a schedule. Agent 24 may start and stop jobs and configure various operational parameters of executor(s) 22. When robot 12 includes multiple executors 22, agent 24 may coordinate their activities and/or inter-process communication. RPA agent 24 may further manage communication between RPA robot 12 and orchestrator 14 and/or other entities.

In some embodiments executing in a Windows™ environment, robot 12 installs a Microsoft Windows™ Service Control Manager (SCM)-managed service by default. As a result, such robots can open interactive Windows™ sessions under the local system account and have the processor privilege of a Windows™ service. For instance, a console application may be launched by a SCM-managed robot. In some embodiments, robot 12 can be installed at a user level of processor privilege (user mode, ring 3.) Such a robot has the same rights as the user under which the respective robot has been installed. For instance, such a robot may launch any application that the respective user can. On computing systems that support multiple interactive sessions running simultaneously (e.g., Windows™ Server 2012), multiple robots may be running at the same time, each in a separate Windows™ session, using different usernames.

In some embodiments, robot 12 and orchestrator 14 may execute in a client-server configuration. It should be noted that the client side, the server side, or both, may include any desired number of computing systems (e.g., physical or virtual machines) without deviating from the scope of the invention. In such configurations, robot 12 including executor(s) 22 and RPA agent 24 may execute on a client side. Robot 12 may run several jobs/workflows concurrently. RPA agent 24 (e.g., a Windows™ service) may act as a single client-side point of contact of executors 22. Agent 24 may further manage communication between robot 12 and orchestrator 14. In some embodiments, communication is initiated by agent 24, which may open a WebSocket channel to orchestrator 14. Agent 24 may subsequently use the channel to transmit notifications regarding the state of each executor 22 to orchestrator 14, for instance as a heartbeat signal. In turn, orchestrator 14 may use the channel to transmit acknowledgements, job requests, and other data such as RPA scripts 40 to robot 12.

Orchestrator 14 may execute on a server side, possibly distributed over multiple physical and/or virtual machines. In one such embodiment, orchestrator 14 may include an orchestrator user interface (UI) 17 which may be a web application, and a set of service modules 19. Service modules 19 may further include a set of Open Data Protocol (OData) Representational State Transfer (REST) Application Programming Interface (API) endpoints, and a set of service APIs/business logic. A user may interact with orchestrator 14 via orchestrator UI 17 (e.g., by opening a dedicated orchestrator interface on a browser), to instruct orchestrator 14 to carry out various actions, which may include for instance starting jobs on robot 12, creating robot groups/pools, assigning workflows to robots, adding/removing data to/from queues, scheduling jobs to run unattended, analyzing logs per robot or workflow, etc. Orchestrator UI 17 may use Hypertext Markup Language (HTML), JavaScript (JS), or any other data format known in the art.

Orchestrator 14 may carry out actions requested by the user by selectively calling service APIs/business logic. In addition, orchestrator 14 may use the REST API endpoints to communicate with robot 12. The REST API may include configuration, logging, monitoring, and queueing functionality. The configuration endpoints may be used to define and configure application users, permissions, robots, assets, releases, etc. Logging REST endpoints may be used to log different information, such as errors, explicit messages sent by the robots, and other environment-specific information, for instance. Deployment REST endpoints may be used by robots to query the version of RPA script 40 to be executed. Queueing REST endpoints may be responsible for queues and queue item management, such as adding data to a queue, obtaining a transaction from the queue, setting the status of a transaction, etc. Monitoring REST endpoints may monitor the web application component of orchestrator 14 and RPA agent 24.

In some embodiments, RPA environment 10 (FIG. 1) further comprises a database server 16 connected to an RPA database 18. In an embodiment wherein server 16 is provisioned on a cloud computing platform, server 16 may be embodied as a database service, e.g., as a client having a set of database connectors. Database server 16 is configured to selectively store and/or retrieve data related to RPA environment 10 in/from database 18. Such data may include configuration parameters of various robots 12a-c, robot pools, as well as data characterizing workflows executed by various robots, and data characterizing users, roles, schedules, queues, etc. Another exemplary category of data stored and/or retrieved by database server 16 includes data characterizing the current state of each executing robot. Yet another exemplary category of data includes messages logged by various robots during execution. Database server 16 and database 18 may employ any data storage protocol and format known in the art, such as structured query language (SQL), ElasticSearch™, and Redis™, among others. In some embodiments, data is gathered and managed by orchestrator 14, for instance via logging REST endpoints. Orchestrator 14 may further issue structured queries to database server 16.

In some embodiments, RPA environment 10 (FIG. 1) further comprises communication channels/links 15a-e interconnecting various members of environment 10. Such links may be implemented according to any method known in the art, for instance as virtual network links, virtual private networks (VPN), or end-to-end tunnels. Some embodiments further encrypt data circulating over some or all of links 15*a-e*.

Figure 3:
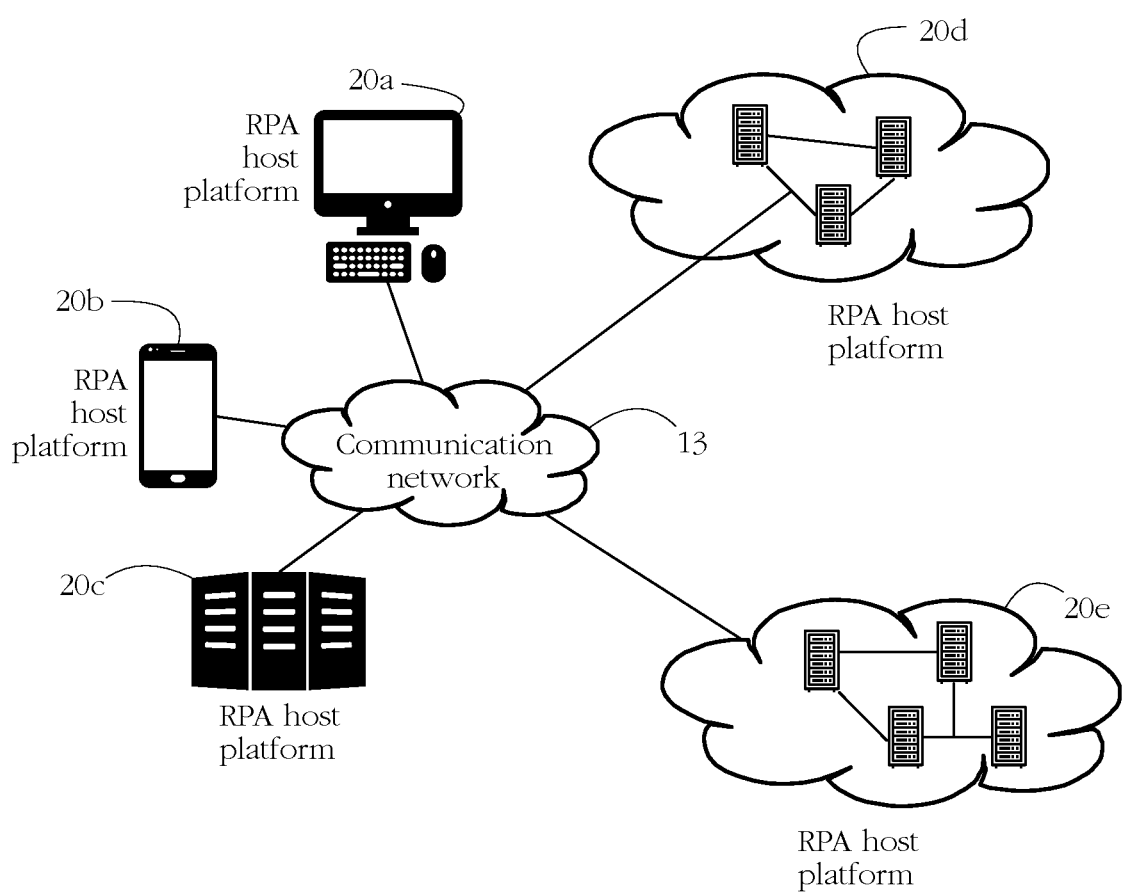
FIG. 3 shows a variety of RPA host systems according to some embodiments of the present invention.

A skilled artisan will understand that various components of RPA environment 10 may be implemented and/or may execute on distinct host computer systems (physical appliances and/or virtual machines.) FIG. 3 shows a variety of such RPA host systems 20*a-e* according to some embodiments of the present invention. Each host system 20*a-e* represents a computing system (e.g. an individual computing appliance, or a set of interconnected computers) having at least a hardware processor, a memory unit and a network adapter enabling the respective RPA host to connect to a computer network 13 and/or to other computing devices. Exemplary RPA hosts 20*a-c* include personal computers, laptop and tablet computers, mobile telecommunication devices (e.g., smartphones), and corporate mainframe computers, among others. Other exemplary hosts illustrated as hosts 20*d-e* include cloud computing platforms such as server farms operated by Amazon™ AWS and Microsoft™ Azure™. A cloud computing platform comprises a plurality of interconnected server computer systems centrally-managed according to a platform-specific protocol. Clients may interact with such cloud computing platforms using platform-specific interfaces/software layers/libraries (e.g., software development kits—SDKs, plugins, etc.) and/or a platform-specific syntax of commands. Exemplary platform-specific interfaces include the Azure™ SDK and AWS™ SDK, among others.

Yet another exemplary RPA host includes an on-premises computer (e.g., server). The term "on-premises" is used herein to denote hardware owned by the person/organization using the respective RPA software and/or owning the RPA jobs being executed on the respective hardware, as opposed to for instance a cloud platform, which is owned by an entity distinct from said person/organization.

FIGS. 4-A-B show exemplary software executing on an RPA host platform 20 in various configurations. The illustrated RPA host platform 20 may represent any of RPA hosts 20*a-e* in FIG. 3, for instance a standalone personal computer, an on-premises server, a cloud computing platform, etc. In one such embodiment illustrated in FIG. 4-A, platform 20 executes an operating system (OS) 30 and an instance of an RPA target application 32, i.e., the software application targeted for automation by robot 12, e.g., an instance of Microsoft Excel™ or a web browser. OS 30 may comprise any widely available operating system such as Microsoft Windows™, MacOS™, Linux™, iOS™, or Android™, among others, comprising a software layer that interfaces between application 32 and the hardware of host platform 20. RPA target application 32 generically represents any computer program used by a human operator to carry out a task. Exemplary applications 32 include, among others, a word processor, a spreadsheet application, a graphics application, a browser, a social media application, and an electronic communication application.

In some embodiments that employ hardware virtualization technologies such as cloud computing among others, some components of RPA environment 10 may execute within a virtual machine (VM), as shown in FIG. 4-B. Virtual machines are known in the art as software emulations of actual physical machines/computer systems, capable of running an operating system and other applications. Some cloud computing platforms employ a hypervisor 26 to expose a set of VMs 28*a-b*. Hypervisor 26 comprises a software layer typically executing at the highest level of processor privilege (i.e., most privileged level sometimes known as root or ring −1). Exposing a VM herein encompasses creating or enabling a plurality of virtualized devices, such as a virtual processor and virtual controllers, and presenting such virtualized devices to software in place of the real, physical devices of host platform 20. Each virtualized device (e.g., processor, input, output, storage, etc.) emulates at least some of the functionality of the respective physical device of host platform 20. For instance, software executing on a virtualized processor may send and/or receive network traffic via a virtualized network adapter. Hypervisor 26 may further enable multiplexing (sharing) of hardware resources of RPA host 20 by multiple VMs 28*a-b*. In some embodiments, such sharing is configured so that each VM 28*a-b* operates independently and is unaware of other VMs executing concurrently on host platform 20.

In some embodiments, RPA host platform 20 may further execute a usage metering module 29 configured to determine various measures of a current workload of the respective RPA host, for instance a count of VMs currently instantiated on the respective host platform, a count of instances of RPA robot 12 that are currently executing and/or idle, an amount of a hardware resource (e.g., processor cycles, memory, data traffic) currently consumed by the respective host platform, etc. Metering module 29 may form a part of hypervisor 26 as illustrated, but this configuration is not meant to be limiting. Metering module 29 may use any method known in the art of hardware virtualization to determine workload measures, for instance via memory introspection or by collaborating with a set of metering agents inserted into individual VMs 28*a-b*.

Figure 5:
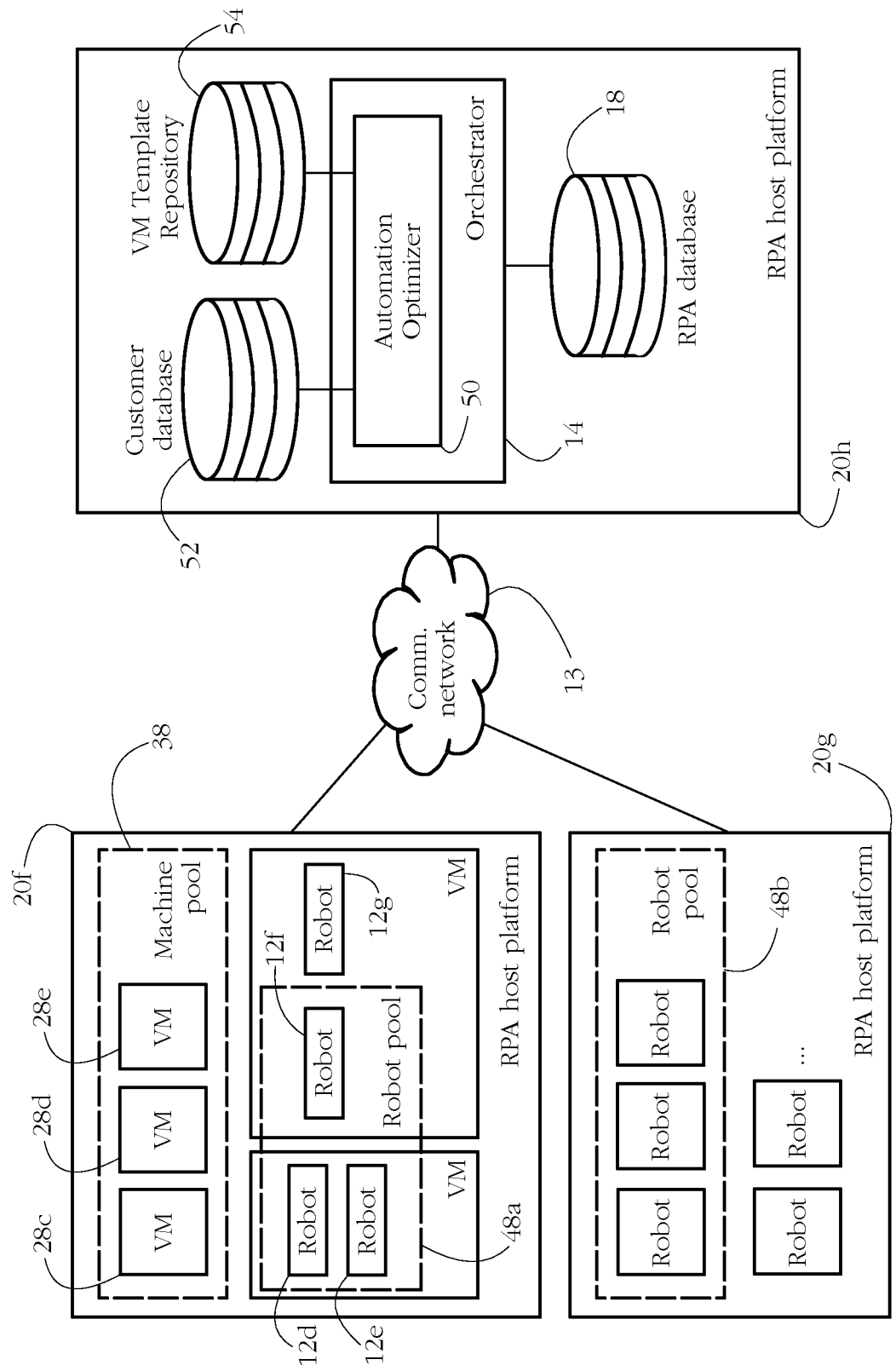
FIG. 5 illustrates an exemplary RPA orchestrator deploying robots to a plurality of RPA host platforms according to some embodiments of the present invention.

FIG. 5 illustrates an exemplary orchestrator 14 managing RPA activities across multiple RPA host platforms according to some embodiments of the present invention. While FIG. 5 shows only three RPA host platforms, an artisan will understand that the present description extends identically to virtually any number of RPA hosts. Each illustrated RPA host platform 20*f-g-h* may represent a distinct computing system, e.g., an individual computer, on-premises server and/or cloud computing platform. Each host platform may represent a cloud computing platform operating according to a distinct protocol and/or owned by a distinct entity. For instance, platform 20*f* may comprise an Amazon AWS™ server, while platform 20*g* may represent a Microsoft Azure™ server. In turn, some or all components of orchestrator 14 may execute on yet another RPA host 20*h* (e.g., a Google™ Cloud Platform server from Google, Inc.). Orchestrator 14 may communicate with RPA hosts 20*f-g* over communication network 13, which may include the Internet.

Each RPA host platform 20*f-g* may execute a plurality of virtual machines (exemplary virtual machines are illustrated as VMs 28*c-d-e* in FIG. 5). Each VM may be identified by a unique identifier, e.g., VM ID, so that it may be selectively started, stopped, inspected, configured, etc. In some embodiments, VMs currently exposed/instantiated on a host may be grouped into pools, such as a machine pool 38 illustrated in FIG. 5. Such grouping may reflect a common ownership, a common hardware or software configuration, and/or assignment to a common task. For instance, machines belonging to one machine pool may be owned and/or operated by customer A, while machines belonging to another machine pool may be owned and/or operated by customer B. In another example, VMs belonging to one machine pool may be reserved/assigned to one type of RPA job, while VMs belonging to another machine pool may be reserved/assigned to another type of RPA job.

Each RPA host platform 20*f-g* may further execute a plurality of RPA robots, some of which may execute within virtual machines. Each RPA robot may be identified by a unique robot ID, so that it may be selectively started, stopped, inspected, configured, assigned a job, etc. Some RPA robots may also be grouped into pools (see e.g., robot pools 48*a-b* illustrated in FIG. 5). Such grouping may reflect a common ownership, a common robot type, assignment to a common task, etc. Robots executing on the same RPA host, or within the same VM, are not necessarily part of the same robot pool. In the example of FIG. 5, RPA robots 12*d-e-f* belong to robot pool 48*a*, while robot 12*g* does not.

In some embodiments, orchestrator 14 maintains a mapping between RPA jobs currently in execution and RPA hosts, VM(s) and/or RPA robot(s) executing the respective jobs. Orchestrator 14 may further map robots to the VMs they are executing on, individual VMs to their respective machine pools, and/or individual RPA robots to their respective robot pools. Such mappings may be encoded and stored as part of RPA database 18.

In some embodiments, an automation optimizer 50 is configured to dynamically scale RPA activities on RPA host platforms 20*f-g* on behalf of multiple customers, as shown in detail below. Although FIG. 5 shows optimizer 50 as part of orchestrator 14, this configuration is not meant to be limiting. In alternative embodiments, automation optimizer 50 may execute as a separate entity to orchestrator 14, and even execute on a distinct RPA host platform. In such embodiments, optimizer 50 may communicate with orchestrator 14 via a dedicated application programming interface (API).

Automation optimizer 50 may interface with a customer database 52 and a VM template repository 54. Such interfaces may be embodied as a database server. In some embodiments, customer database 52 may comprise a set of customer records indicating various parameter values characterizing each of a plurality of distinct RPA customers. An exemplary customer record may specify, for instance, various aspects of a service-level agreement (SLA) between the respective RPA customer and the operator of automation optimizer 50, such as a type, duration, and/or a time window for providing RPA services to the respective customer, etc. A customer record may further indicate an RPA host platform (e.g., a cloud computing platform such as Amazon AWS™) that the respective customer uses for RPA purposes. For instance, the respective customer record may include a location indicator (e.g., URL, network address) of an on-premises server of the respective customer, the on-premises server used for RPA activities. The customer record may further comprise a set of customer credentials (e.g., username, password, etc.) for accessing the respective RPA host platform or a configuration interface of the respective RPA host platform.

A customer record stored in customer database 52 may further include an indicator of whether automation optimizer 50 is allowed to instantiate and/or terminate virtual machines on behalf of the respective customer. Other information encoded in a customer record may comprise an identifier of a virtual machine and/or of a pool of VMs currently assigned by the respective customer to RPA activities. In such embodiments, orchestrator 14 may allocate RPA jobs exclusively to the respective indicated target VM, or exclusively to VMs selected from the indicated machine pool. Similarly, a customer record may comprise an identifier of an RPA robot and/or an identifier of a robot pool. In such embodiments, orchestrator 14 may allocate jobs exclusively to the indicated robot or to members of the indicated robot pool.

A customer record may further include various RPA workload parameter values, such as a maximum and/or minimum number of virtual machines and/or RPA robots of a selected type that may be simultaneously instantiated on a selected RPA host platform on behalf of the respective customer, a preferred time slot for carrying out RPA activities on a selected RPA host platform, etc.

A customer record may further comprise an identifier or a VM template stored in template repository 54, the respective template used for instantiating VMs on behalf of the respective customer. The customer record may further indicate a type of RPA job to be performed for the respective customer.

In some embodiments, dynamically scaling RPA activities up and/or down comprises optimizer 50 instantiating new VMs and/or terminating existing VM instances on selected RPA host platforms. Alternatively, dynamically scaling RPA activities may comprise starting and/or stopping VMs on selecting RPA host platforms. Instantiating a VM may comprise exposing a set of virtual hardware devices making up the respective VM (e.g., virtual processor, virtual network devices, etc.), and/or creating new instances of software components (e.g., RPA robots) executing within the respective VM. Software that executes on a virtual processor of a VM is herein said to execute within the respective VM. In the example illustrated in FIG. 4-B, OS 30 and robot 12 execute within VM 28*a*. In contrast, hypervisor 26 executes outside of VMs 28*a-b*.

VMs instantiated for RPA purposes may be endowed with RPA-specific software, such as a set of RPA robots 12, and/or an instance of an RPA target application 32. Robots 12 and/or target application 32 may vary according to a type of RPA job. For instance, a VM instantiated for performing robotic manipulations of spreadsheet data may comprise an instance of Microsoft Excel™, while another VM instantiated for robotic scraping of web data may not.

Some embodiments use VM templates to characterize each type of VM currently available for instantiation for RPA purposes. An exemplary VM template comprises a set of parameter values collectively characterizing the respective VM. For instance, a VM template may include a set of hardware parameter values such as a type of processor, an amount of virtual memory reserved for the respective VM, or a reserved bandwidth/maximum communication throughput of the respective VM, among others. The VM template may further comprise values of specific software parameters such as a type and version of operating system to be instantiated on the respective VM. The VM template may further comprise memory images (e.g., snapshots) of the software components to be instantiated on the respective VM, such as RPA robot(s) 12 and/or RPA target application 32, etc. An image of a software entity herein denotes a data structure which, when loaded into a memory of a computer system, causes the respective computer system to execute the respective software entity.

Some VM templates may include an indicator (e.g. URL or network address) of a target RPA host platform where the respective VM will be instantiated. Templates may further include a set of commands and/or scripts for instantiating the respective VM onto a target host platform. Such VM templates may be host-specific, i.e., each template may be formulated and configured to be used for instantiating the respective VM on a particular type of RPA host. For instance, there may be distinct VM templates for provisioning a web-scraping robot on a local (on-premises) machine versus on a cloud computing platform such as Microsoft™ Azure™. Templates may be developed, tested, and maintained by a team of engineers according to customer specifications and/or wishes, or provided by the customers themselves. Templates may be indexed, stored in, and selectively retrieved from a template repository 54, which may comprise a database using any protocol and data format known in the art (e.g. relational database, Redis™ store, etc.). Template repository 54 may further store an indicator of an association between each VM template and a type of RPA job requiring instantiation of the respective VM template.

Figure 6:
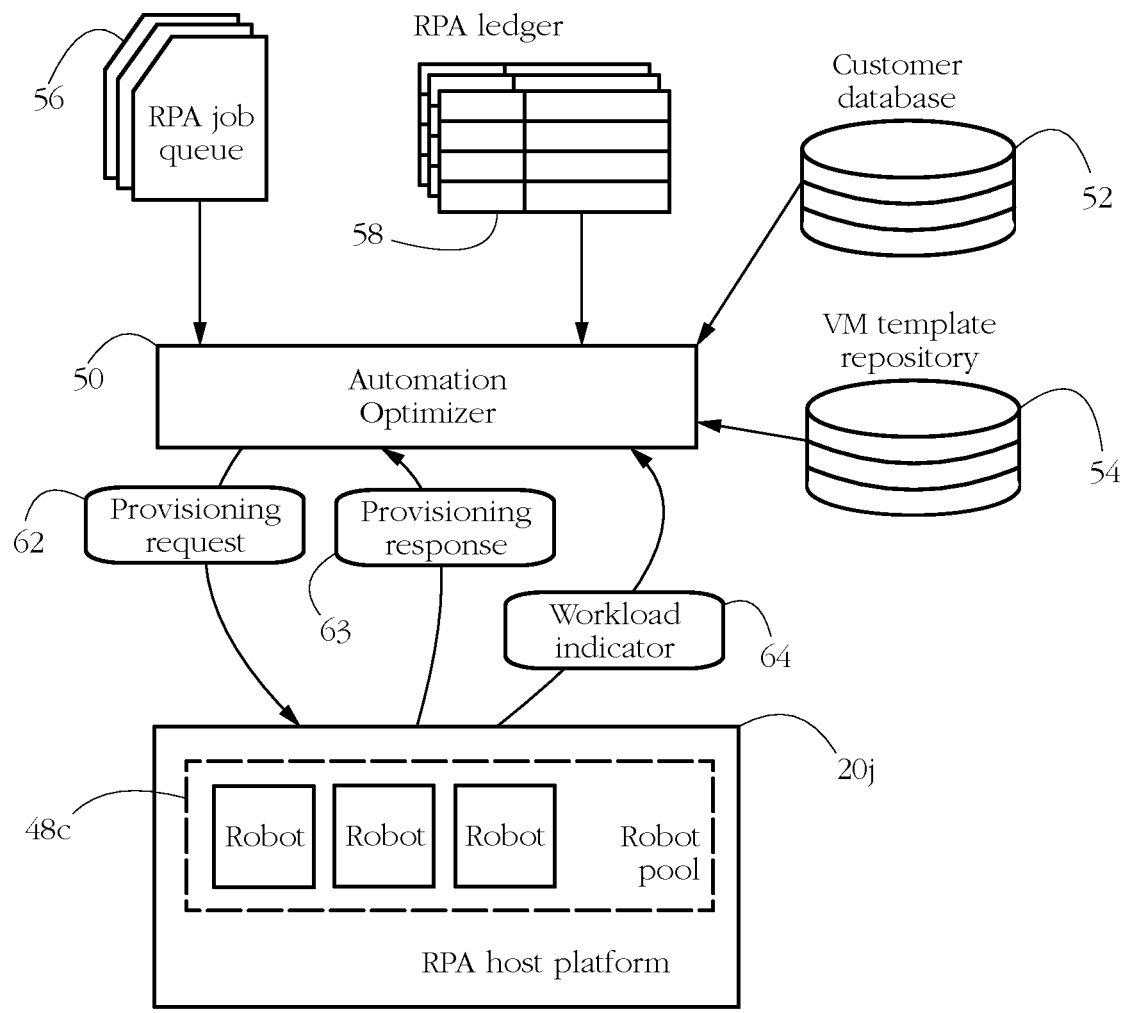
FIG. 6 illustrates the operation of an exemplary automation optimizer according to some embodiments of the present invention.

FIG. 6 illustrates an exemplary operation of automation optimizer 50 according to some embodiments of the present invention. Optimizer 56 receives or retrieves a content of an RPA job queue 56 maintained by orchestrator 14. In some embodiments, queue 56 comprises a set of job indicators indicative of RPA jobs currently awaiting execution. The term 'job' herein denotes an instance of executing an RPA workflow. The respective workflow may be encoded in computer-readable form as an RPA script (see e.g., script 40 in FIG. 2). Jobs may be directly added to queue 56 by users, for instance via orchestrator UI 17 (FIG. 2), or may be added automatically by orchestrator 14 as part of scheduling etc. Jobs may be removed from queue 56 upon completion.

In some embodiments, each job in queue 56 is represented by a job indicator, which in turn may include an indicator of a customer on behalf of whom the respective job is being executed, and an identifier of a target machine (e.g., VM 28c in FIG. 5) on which the respective job must be executed. Alternatively, the job indicator may include an identifier of a machine pool (e.g., machine pool 38 in FIG. 5) comprising machines capable of or reserved for executing the respective job, and/or an identifier of a robot pool (e.g., robot pool 48b in FIG. 5) comprising RPA robots for executing the respective job. In some embodiments, the job indicator may further indicate (e.g., via a pointer into template repository 54) a VM template representing a machine pre-configured for executing the respective RPA job. The job indicator may further indicate a desired time window for executing the respective RPA job, and a priority of the respective job, among others.

Automation optimizer 50 may further receive or access a current RPA ledger 58 characterizing RPA jobs that are currently in execution, or that have already been assigned for execution to various robots/machines. An exemplary ledger 58 may comprise a plurality of job entries, each job entry indicating a current status of the respective job (e.g., in execution, finished, paused, hung, expired, error code characterizing a type of error that has occurred during execution, etc.) and an identifier of a machine and/or instance of RPA robot 12 that the respective job is currently allocated to.

In some embodiments, optimizer 50 may receive a workload indicator 64 from an RPA host platform 20j (FIG. 6), indicator 64 indicative of a current status and/or workload of a selected machine and/or robot instantiated on the respective RPA host platform. An exemplary workload indicator 64 may include a count of VMs currently running on behalf of a selected customer, a count of robot instances executing on behalf of a selected customer, a count of VMs currently belonging to a selected machine pool, and a count of RPA robots currently belonging to a selected robot pool (e.g., robot pool 48c in FIG. 6). Another exemplary workload indicator 64 may indicate a current amount of hardware resources (e.g., memory, processor cycles, data traffic) consumed on RPA activities on behalf of a selected customer. Workload indicator 64 may be generated on demand or automatically, for instance using a heartbeat model. When RPA robots are hosted on a cloud computing platform, workload indicator 64 may be generated by a cloud management interface in response to a query sent by automation optimizer 50. In some embodiments, workload indicator 64 may be generated by a software module executing on the respective RPA host, for instance usage metering module 29 in FIG. 4-B.

As part of a dynamic scaling of RPA activities, optimizer 50 may initiate a provisioning procedure via a provisioning request 62 sent to a selected RPA host platform such as platform 20j in FIG. 6. Request 62 may include a set of commands and/or a script formulated in a programming/scripting language. An exemplary provisioning request 62 may include an authentication exchange followed by a command to instantiate a VM on RPA host platform 20j. Another exemplary request 62 may include an image of the virtual machine to be instantiated, and/or an RPA script 40 indicating a workflow to be executed. Yet another exemplary provisioning request 62 includes a set of commands for establishing a virtual network connection (e.g., a VPN link) between a recently provisioned RPA robot and orchestrator 14. Yet another exemplary provisioning request 62 comprises a set of commands for terminating a selected VM currently exposed on RPA host 20j.

In response to receiving request 62, RPA host platform 20j may transmit a provisioning response 63 back to automation optimizer 50, response 63 including for instance an acknowledgement of receiving a provisioning request, a status of a received request indicating whether the request was executed successfully or whether carrying out the operations specified in the respective request have failed, a set of error codes indicating a reason for a failure to carry out a procedure specified in a received request, etc. Provisioning response 63 may further include a set of credentials for accessing a provisioned resource (e.g., VM, robot) and/or an address (e.g., network address, uniform resource locator—URL, fully qualified domain name—FQDN) of the respective provisioned resource.

In some embodiments, for instance wherein RPA host 20j is a cloud computing platform, optimizer 50 may exchange items 62-63 not with the actual physical machine that hosts a selected VM or robot, but with a cloud management server/interface that may subsequently select and configure the respective physical machine to receive and/or execute the respective VM/robot(s).

Figure 7:
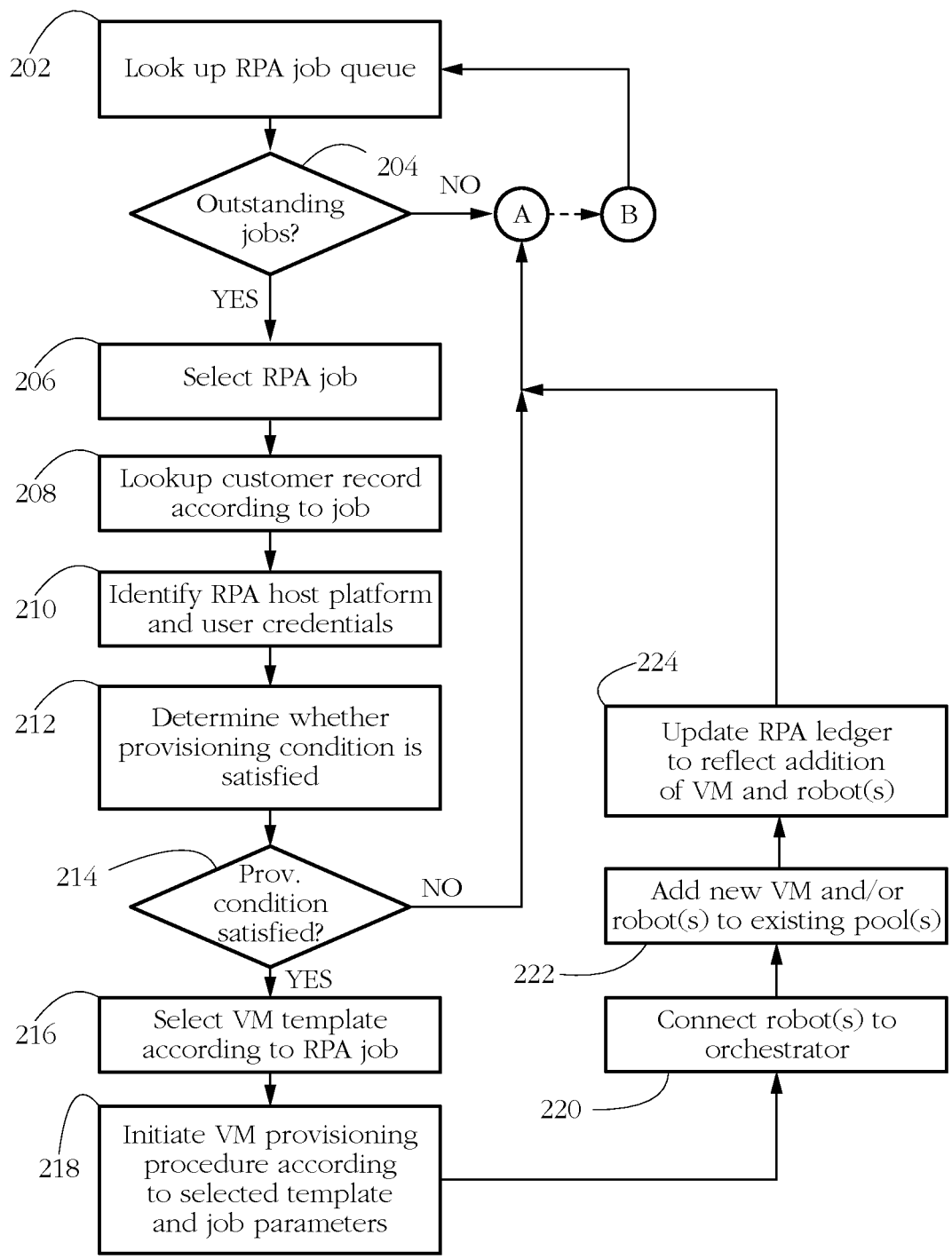
FIG. 7-A shows an exemplary sequence of steps performed by the automation optimizer according to some embodiments of the present invention.

FIGS. 7-A-B show an exemplary sequence of steps performed by automation optimizer 50 according to some embodiments of the present invention. A sequence of steps 202-204 may wait until RPA job queue 56 comprises outstanding jobs. When yes, a step 206 may select a job from queue 56. In a step 208, optimizer 208 may identify a customer associated with the selected job and look up a customer record of the respective customer in database 52. In some embodiments, the queue entry for the selected job may indicate the respective customer. Next, a step 210 may identify an RPA host platform for executing the respective job and retrieve a set of credentials (e.g., user name, password) for accessing the respective host platform, according to a job indicator and/or according to the customer record. Optimizer 50 may thus determine whether the respective RPA host platform is a standalone machine, an on-premises server, a cloud computing platform, etc., and may further determine a location (e.g., network address) of the respective RPA host. In some embodiments, the customer record and/or the queue entry/job indicator of the selected job further includes an identifier of a target machine/machine pool, or target RPA robot/robot pool for executing the respective job. When a machine or a robot pool is indicated, automation optimizer 50 may select a target machine and/or robot from the respective pool, as further shown below.

Some embodiments may next determine whether to assign the current job to an existing machine/robot, or to provision a new machine/robot for the task. To decide, a step 212 may determine whether a provisioning condition is satisfied. In some embodiments, step 212 comprises determining according to a customer record stored in customer database 52 whether optimizer 50 is allowed to instantiate new machines and/or robots on behalf of the respective customer or owner of the current job. In one use case scenario, the customer may manage a machine pool on a cloud computing platform (e.g., Amazon AWS™), the VMs of the pool reserved and/or assigned to RPA activities according to a daily schedule. However, the customer hosts, manages, and maintains the respective machines him/herself, and does not allow optimizer 50 to instantiate new machines/robots, or to terminate existing machines/robots of the respective pool. In such a situation, optimizer 50 may only assign the current job to an existing machine/robot of the respective machine/robot pool, as further detailed below.

In another use case scenario, the RPA customer/owner of the current job allows optimizer 50 to dynamically scale computing resources up and down according to demand, as indicated in a customer record associated with the respective customer. In such a situation, determining whether the provisioning condition is satisfied (step 212 in FIG. 7-A) may comprise determining whether computing resources already instantiated on the identified RPA host platform are sufficient for processing the current job or not. This determination may proceed according to a content of RPA ledger 58 and/or a workload indicator 64 received from the respective RPA host platform. In some embodiments, workload indicator 64 may indicate, for instance, a count of VMs and/or RPA robots currently running RPA jobs on the respective RPA host platforms. Meanwhile, RPA ledger 58 may indicate a current status of each RPA job (e.g., running, hung, finished, etc.). Some embodiments may determine whether the provisioning condition is satisfied further according to a maximum allowable count of machines and/or robot instances, as indicated in a license or service level agreement (SLA) with the respective customer, and/or as indicated in a customer record associated with the respective customer and stored in customer database 52. In one such example, optimizer 50 may determine that the provisioning condition is satisfied when all RPA robots of a selected pool are currently busy, and when the current count of RPA robots in the selected pool is below the maximum allowed robot count.

In some embodiments, determining whether the provisioning condition is satisfied may proceed further according to a current content of RPA job queue 56. For instance, some embodiments may determine whether the provisioning condition is satisfied according to a current length of queue 56 (e.g., count of outstanding jobs, count of jobs of various types), according to an estimated duration of execution of the current job and/or other outstanding jobs in RPA queue 56, and/or according to a priority of the current job or of other jobs in the queue. Another criterion for determining whether the provisioning condition is satisfied includes a job latency, for instance an average amount of time spent by a selected job (or jobs of a selected job type) in job queue 56. Further criteria for determining whether the provisioning condition is satisfied may include whether the target machine pool currently contains a machine having an appropriate hardware and/or software configuration for executing the current job. For instance, optimizer 50 may determine whether any machine in the target machine pool was instantiated according to a specific VM template, and/or whether any machine has a particular type and/or version of RPA target application 32, etc. In one such example, optimizer 50 may determine that the provisioning condition is satisfied when there are currently no machines in the target pool capable of and/or configured to carry out the current RPA job.

Yet other criteria for deciding whether the provisioning condition is satisfied may include the current time and/or calendar date. In one such example, optimizer 50 may be allowed to dynamically scale computational resources of RPA host platform only within a specific time window (e.g., during nighttime), on specific calendar dates (e.g., first day of the month, last business day of each month) and/or during specific weekdays (e.g., during the weekend), etc. Such time preferences and limitations may be used for cost control and may be specified in a customer database record associated with the respective customer and/or in an RPA queue entry associated with the current job.

When the provisioning condition is not satisfied (step 214 returns a NO), some embodiments may advance to a sequence of steps illustrated in FIG. 7-B and detailed below. Meanwhile, optimizer 14 may assign the current job to an existing VM and/or RPA robot instance. The respective VM and/or robot may be selected from a selected machine/robot pool according to various criteria, such as according to a hardware and/or software configuration of the respective machine, according to a current workload of the respective machine, according to a count of robot instances executing on the respective machine, etc. For instance, orchestrator 14 may select a VM to and/or a robot which is currently the least loaded. The tasks of starting, stopping, monitoring, and communicating with the respective VM/robot may be performed according to any method known in the art of robotic process automation, and are beyond the scope of the present description.

When the provisioning condition is satisfied (step 214 returns a YES), some embodiments may provision a new machine on the respective RPA host platform, which in turn comprises instantiating a set of RPA robot instances. A step 216 may select a VM template from template repository 54 according to the current job and/or according to other criteria such as current availability, customer preference, etc. In a further step 218, optimizer 50 may initiate a VM provisioning procedure according to the selected template and additional job parameters. Step 218 may comprise transmitting a provisioning request 62 to and receiving a response 63 from the selected RPA host platform (or from a cloud configuration interface of the respective RPA host platform). Provisioning request 62 may comprise a set of commands/instructions causing the respective RPA host platform to instantiate a new VM with the specified parameters and/or using the specified VM template. The set of commands/instructions may be platform-specific, in the sense that they comply with a platform-specific protocol and may be formulated according to a platform-specific API (e.g., Azure™ SDK vs. AWS™ SDK).

In response to receiving provisioning response 63 indicating a successful provisioning of the new VM, a step 220 may connect/register the newly instantiated robot instances with RPA orchestrator 14. Connecting each robot to orchestrator 14 may comprise generating a unique identifier for the respective RPA robot, and providing the respective robot with a location indicator (e.g., URL, network address, etc.)

of orchestrator 14. In some embodiments, connecting may further comprise setting up a virtual network (e.g., a VPN) or a peer-to-peer connection between the respective robot and orchestrator 14. Such operations effectively prepare the respective robot for receiving job assignments from orchestrator 14.

A step 222 may add the newly instantiated VM and/or robot instances to an existing machine/robot pool, for instance by updating a database entry associating individual machines with machine pools and/or with customers. When no such pool is currently defined on the respective RPA host platform, step 222 may initialize a new pool to include the newly instantiated VM and/or RPA robot(s). In a further step 224, some embodiments update RPA ledger 58 to reflect the addition of new a VM and/or robot instance(s). RPA ledger 58 may be further updated by orchestrator 14 to reflect assignment of a new RPA job to a newly instantiated RPA robot.

FIG. 7-B shows another sequence of steps performed by some embodiments of automation optimizer 50, the sequence illustrating scaling down computational resources by for instance terminating idle VMs. A sequence of steps 232-234 may look up RPA ledger 58 and determine whether a termination condition is satisfied, and when yes, optimizer 50 may terminate at least one VM and remove it from the respective machine pool.

Some embodiments determine whether the termination condition is satisfied according to a current content of ledger 58, a current workload of machines/robots carrying out RPA jobs on behalf of a customer, and possibly further according to customer preferences. In one example, step 234 may use information in RPA ledger 58 and a content of at least one workload indicator 64 to identify machines and/or robot instances which are currently idle, i.e., which are currently not assigned to any RPA job. Optimizer 50 may then identify a customer according to the respective machine/robot or according to a machine/robot pool that the respective machine/robot belongs to, and look up customer database 52 to determine a set of preferences associated with the respective customer. An exemplary optimizer may decide that a termination condition is satisfied when a selected machine or robot instance has been idle for a period of time that exceeds a pre-determined threshold.

Some embodiments may further determine whether a termination condition is satisfied according to whether a selected VM or RPA robot is currently hung or experiencing technical difficulties, such as a fault (e.g., hardware or software exception, a bug in RPA script 40, etc.), a communication failure, etc. One such exemplary optimizer 50 may determine that a termination condition is satisfied when a selected machine or robot instance has not communicated with orchestrator 14 for a time period that exceeds a pre-determined threshold (e.g., when orchestrator 14 has not received a pre-determined number of consecutive heartbeat signals from the respective VM/robot).

Other criteria for determining whether a termination condition is satisfied include a current content of RPA job queue 56, an average job latency, a current count of VMs and/or RPA robots instantiated on the respective RPA host platform, and/or a current count of VMs and/or robots within a machine or robot pool associated with the respective customer. One exemplary optimizer 50 may decide not to terminate a machine or a robot instance that is currently idle when queue 56 includes RPA jobs belonging to the same customer or likely to be assigned to machines or robots from the same pool.

Other exemplary criteria for determining whether the termination condition is satisfied for a selected machine include whether optimizer 50 is allowed to scale computational resources on behalf of the respective customer, and a current time and/or calendar date, among others.

When the termination condition is satisfied for a selected machine, a step 238 may initiate a termination of the respective machine, for instance by transmitting a provisioning request 62 to the respective RPA host platform, request 62 identifying the selected machine and formulated so as to cause the respective host platform to terminate the respective machine. In response to receiving a provisioning response 63 indicating successful termination, a step 240 may disconnect the RPA robots previously executing on the terminated VM from orchestrator 14.

A sequence of steps 242-244 may then remove the terminated VM and/or robot(s) from their respective pools, and update RPA ledger 58 to reflect termination of the respective machine and/or robot instances. Execution may then proceed to a step 202 described above in relation to FIG. 7-A.

FIG. 8 shows an exemplary hardware configuration of a computer system 70 programmed to execute some of the methods described herein. Computer system 70 may represent any of RPA host platforms 20a-e in FIG. 3, as well as a executing automation optimizer 50, for instance. The illustrated appliance is a personal computer; other devices such as servers, mobile telephones, tablet computers, and wearables may have slightly different configurations. Processor(s) 72 comprise a physical device (e.g. microprocessor, multi-core integrated circuit formed on a semiconductor substrate) configured to execute computational and/or logical operations with a set of signals and/or data. Such signals or data may be encoded and delivered to processor(s) 72 in the form of processor instructions, e.g., machine code. Processor(s) 72 may include a central processing unit (CPU) and/or an array of graphics processing units (GPU).

Memory unit 73 may comprise volatile computer-readable media (e.g. dynamic random-access memory—DRAM) storing data/signals/instruction encodings accessed or generated by processor(s) 72 in the course of carrying out operations. Input devices 74 may include computer keyboards, mice, and microphones, among others, including the respective hardware interfaces and/or adapters allowing a user to introduce data and/or instructions into computer system 70. Output devices 75 may include display devices such as monitors and speakers among others, as well as hardware interfaces/adapters such as graphic cards, enabling the respective computing system to communicate data to a user. In some embodiments, input and output devices 74-75 share a common piece of hardware (e.g., a touch screen). Storage devices 76 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 77 enable computing system 70 to connect to an electronic communication network (e.g, network 13 in FIG. 3) and/or to other devices/computer systems.

Controller hub 78 generically represents the plurality of system, peripheral, and/or chipset buses, and/or all other circuitry enabling the communication between processor(s) 72 and the rest of the hardware components of computer system 70. For instance, controller hub 78 may comprise a memory controller, an input/output (I/O) controller, and an interrupt controller. Depending on hardware manufacturer, some such controllers may be incorporated into a single integrated circuit, and/or may be integrated with processor(s) 72. In another example, controller hub 78 may comprise a northbridge connecting processor 72 to memory 73, and/or a southbridge connecting processor 72 to devices 74, 75, 76, and 77.

The exemplary systems and methods described above enable a user-friendly management of complex RPA operations, such as carrying out multiple RPA jobs on behalf of multiple RPA customers, and on multi-tenant computing platforms (e.g., in the cloud or in hybrid configurations that combine cloud with on-premises computing).

Successfully performing RPA in such complex computing environments relies on at least two distinct categories of activities. A first activity category comprises configuring and deploying a diverse fleet of software robots to a variety of computing environments, to meet the specific needs and preferences of each RPA customer. A second activity category comprises efficiently assigning RPA jobs to the fleet of robots (possibly according to complex schedules and/or cost-saving strategies), monitoring, and possibly coordinating the execution of multiple robots. The first activity may require expertise in cloud computing and hardware virtualization, among others. Meanwhile, the second activity may require a solid knowledge or RPA technology and software. Due to the sheer breadth of expertise required to bridge both categories, in conventional RPA the first category of activities is typically decoupled from the second. For instance, the first and second categories of activities are typically carried out by distinct members of a team, or by distinct service providers/contractors.

In contrast to such conventional RPA practices, some embodiments of the present invention automate robot provisioning and maintenance activities, and seamlessly integrates them with RPA job management activities, in a manner that emphasizes efficiency and cost savings while being readily scalable. In some embodiments, an automation optimizer is configured to automatically scale the robot fleet up and down in response to variations in demand for RPA jobs. The automation optimizer may further interface with an RPA orchestrator which assigns RPA jobs to individual robots and manages execution of the respective robots.

In contrast to conventional RPA systems wherein the fleet or robots is static, i.e., does not automatically evolve to accommodate variations in demand, in some embodiments the number of robots available for RPA tasks may be dynamically adjusted by automatically provisioning additional virtual machines capable of executing additional robot instances when demand is high, and removing VMs when demand is low. Some embodiments determine whether a provisioning condition is satisfied according to various criteria, such as a count of current outstanding jobs (length of a job queue), a current load determined for instance according to a current count of VMs executing RPA jobs for a particular customer, a license or service level agreement (SLA) of a particular customer having jobs in the queue, and a current time of the day, among others. When the provisioning condition is satisfied, some embodiments automatically provision a new VM preloaded with a set of robot instances onto a selected RPA host platform. Some embodiments further automatically connect the newly provisioned robots to an orchestrator configured to distribute jobs to the fleet of robots and to monitor and coordinate RPA activities across multiple robots. The type of provisioned VM may be varied according to customer and/or according to a type of jobs currently in the job queue, by selectively deploying a VM template with the required characteristics from a library of available pre-configured templates.

Some embodiments of automation optimizer are capable of provisioning VMs to a variety of RPA host platforms, such as commercial cloud computing platforms (e.g., Amazon AWS™, Microsoft Azure™, etc.), on-premises servers, standalone computers, and hybrid configurations mixing cloud and on-premises resources. Each customer may specify his/her choice of host platform and provide credentials for accessing the respective host platform to the automation optimizer. Some embodiments further enable customers to set up dedicated machine and/or robot pools for various RPA activities.

Described systems and methods further enable upgrading the robot fleet in a seamless and user-friendly manner. Old versions of robots are automatically discarded in response to VM termination by the automation optimizer. Newly provisioned machines may be pre-loaded with upgraded versions of RPA robots, thus renewing the fleet. Such renewal/upgrading may proceed gradually or in bulk (e.g., upgrading an entire robot pool), according to a schedule, according to a current demand for jobs, on demand, etc.

Some embodiments facilitate RPA operations by removing the burden of robot deployment and maintenance from the shoulders of RPA developers. Highly technical tasks such as instantiating virtual machines on diverse computing platforms, deploying robots to the respective platforms, connecting the robots to RPA orchestrators, securing communications between various RPA components, etc., may be taken over by the automation optimizer. Some embodiments may therefore make RPA technology more accessible to users that lack advanced programming skills or expertise in cloud computing and virtualization.

It will be clear to one skilled in the art that the above embodiments may be altered in many ways without departing from the scope of the invention. Accordingly, the scope of the invention should be determined by the following claims and their legal equivalents.

What is claimed is:

1. A robotic process automation (RPA) method comprising employing at least one hardware processor of a computer system to optimize RPA operations on a host platform having a plurality of RPA robots instantiated thereon for executing RPA jobs, the plurality of RPA robots organized into a plurality of robot pools, and wherein optimizing RPA operations comprises:

determine whether a provisioning condition is satisfied according to a queue of RPA jobs, whether a selected job of the queue comprises an identifier of a selected robot pool of the plurality of robot pools;

in response, when the provisioning condition is satisfied, initiating an automatic instantiation of a new RPA robot on the host platform, wherein instantiating the new RPA robot comprises provisioning a virtual machine (VM) by loading a VM template onto the host platform, the VM template selected from a template repository according to the selected job, wherein the VM template comprises a memory image of the VM pre-loaded with the new RPA robot and an instance of a target software application;

in response to the instantiation of the new RPA robot, adding the new RPA robot to the selected robot pool; and assigning the selected job to the new RPA robot for execution;

wherein the plurality of RPA robots executing on the host platform are divided among a plurality of VMs, the plurality of VMs further organized into a plurality of VM pools;

wherein at least one robot pool spans multiple VMs such that at least one VM includes at least one robot assigned to the at least one robot pool and at least one robot not assigned to the at least one robot pool;
wherein the selected job further comprises an identifier of the selected VM pool of the plurality of VM pools; and
wherein the method further comprises employing the at least one hardware processor to, in response to provisioning the VM, adding the VM to the selected pool.

2. The method of claim 1, wherein optimizing RPA operations further comprises employing the at least one hardware processor to look up a customer record of an owner of the selected job and determine whether the provisioning condition is satisfied according to whether the customer record allows instantiating the new RPA robot.

3. The method of claim 1, comprising employing the at least one hardware processor to determine whether the provisioning condition is satisfied according to a count of RPA robots within the pool.

4. The method of claim 3, comprising employing the at least one hardware processor to determine whether the provisioning condition is satisfied further according to a maximum allowable count of RPA robots within the selected robot pool.

5. The method of claim 1, comprising employing the at least one hardware processor to determine whether the provisioning condition is satisfied further according to whether a current time is during nighttime.

6. The method of claim 1, wherein the plurality of RPA robots are organized into robot pools according to a type of automation task executable by members of each robot pool.

7. The method of claim 1, comprising employing the at least one hardware processor to determine whether the provisioning condition is satisfied further according to a current calendar date.

8. The method of claim 1, wherein:
provisioning the VM causes an instantiation of another RPA robot executing within the VM; and
optimizing RPA operations further comprises employing the at least one hardware processor to, in response to provisioning the VM, add the another RPA robot to the selected robot pool.

9. A computer system comprising at least one hardware processor configured to optimize RPA operations on a host platform having a plurality of RPA robots instantiated thereon for executing RPA jobs, the plurality of RPA robots organized into a plurality of robot pools, and wherein optimizing RPA operations comprises:
determining whether a provisioning condition is satisfied according to a queue of RPA jobs, whether a selected job of the queue comprises an identifier of a selected robot pool of the plurality of robot pools;
in response, when the provisioning condition is satisfied, initiating an automatic instantiation of a new RPA robot on the host platform, wherein instantiating the new RPA robot comprises provisioning a virtual machine (VM) by loading a VM template onto the host platform, the VM template selected from a template repository according to the selected job, wherein the VM template comprises a memory image of the VM pre-loaded with the new RPA robot and an instance of a target software application;
in response to the instantiation of the new RPA robot, adding the new RPA robot to the selected robot pool; and
assigning the selected job to the new RPA robot for execution;

wherein the plurality of RPA robots executing on the host platform are divided among a plurality of VMs, the plurality of VMs further organized into a plurality of VM pools;
wherein at least one robot pool spans multiple VMs such that at least one VM includes at least one robot assigned to the at least one robot pool and at least one robot not assigned to the at least one robot pool;
wherein the selected job further comprises an identifier of the selected VM pool of the plurality of VM pools; and
wherein the method further comprises employing the at least one hardware processor to, in response to provisioning the VM, adding the VM to the selected VM pool.

10. The computer system of claim 9, wherein optimizing RPA operations comprises employing the at least one hardware processor to look up a customer record of an owner of the selected job and determine whether the provisioning condition is satisfied according to whether the customer record allows instantiating the new RPA robot.

11. The computer system of claim 9, wherein the at least one hardware processor is further configured to determine whether the provisioning condition is satisfied according to a count of RPA robots within the pool.

12. The computer system of claim 11, wherein the at least one hardware processor is configured to determine whether the provisioning condition is satisfied further according to a maximum allowable count of RPA robots within the selected robot pool.

13. The computer system of claim 9, wherein the at least one hardware processor is further configured to determine whether the provisioning condition is satisfied further according to whether a current time is during nighttime.

14. The computer system of claim 9, wherein the plurality of RPA robots are organized into robot pools according to a type of automation task executable by members of each robot pool.

15. The computer system of claim 9, wherein the at least one hardware processor is configured to determine whether the provisioning condition is satisfied further according to a current calendar data.

16. The computer system of claim 9, wherein:
provisioning the VM causes an instantiation of another RPA robot executing within the VM; and
optimizing RPA operations comprises employing the at least one hardware processor to, in response to provisioning the VM, add the another RPA robot to the selected robot pool.

17. A non-transitory computer-readable medium storing instructions which, when executed by at least one hardware processor of a computer system, cause the computer system to optimize RPA operations on a host platform having a plurality of RPA robots instantiated thereon for executing RPA jobs, the plurality of RPA robots organized into a plurality of robot pools, and wherein optimizing RPA operations comprises:
determining whether a provisioning condition is satisfied according to a queue of RPA jobs, wherein a selected job of the queue comprises an identifier of a selected robot pool of the plurality of robot pools;
in response, when the provisioning condition is satisfied, initiate an automatic instantiation of a new RPA robot on the host platform, wherein instantiating the new RPA robot comprises provisioning a virtual machine (VM) by loading a VM template onto the host platform, the VM template selected from a template repository according to the selected job, wherein the VM template comprises a memory image of the VM pre-loaded with the new RPA robot and an instance of a target software application;

in response to the instantiation of the new RPA robot, adding the new RPA robot to the selected robot pool; and assigning the selected job to the new RPA robot for execution;

wherein the plurality of RPA robots executing on the host platform are divided among a plurality of VMs, the plurality of VMs further organized into a plurality of VM pools;

wherein at least one robot pool spans multiple VMs such that at least one VM includes at least one robot assigned to the at least one robot pool and at least one robot not assigned to the at least one robot pool;

wherein the selected job further comprises an identifier of the selected VM pool of the plurality of VM pools; and wherein the method further comprises employing the at least one hardware processor to, in response to provisioning the VM, adding the VM to the selected VM pool.

\* \* \* \* \*